US008544580B2

(12) United States Patent
Cheng et al.

(10) Patent No.: US 8,544,580 B2
(45) Date of Patent: Oct. 1, 2013

(54) IN-WHEEL SWITCHED RELUCTANCE MOTOR DRIVE

(75) Inventors: Ka Wai Eric Cheng, Hong Kong (HK); Xiangdang Xue, Hong Kong (HK); Chow Norbert Cheung, Hong Kong (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 469 days.

(21) Appl. No.: 12/782,700

(22) Filed: May 18, 2010

(65) Prior Publication Data

US 2011/0284300 A1 Nov. 24, 2011

(51) Int. Cl.
*B60K 7/00* (2006.01)

(52) U.S. Cl.
USPC ...................................... 180/65.51

(58) Field of Classification Search
USPC .................... 180/65.1, 65.51; 310/40 R, 168
See application file for complete search history.

(56) References Cited

U.S. PATENT DOCUMENTS

| | | | | |
|---|---|---|---|---|
| 5,012,172 A | * | 4/1991 | Sember | 318/696 |
| 5,148,090 A | * | 9/1992 | Oku et al. | 318/107 |
| 5,207,288 A | * | 5/1993 | Ono | 180/220 |
| 6,093,993 A | * | 7/2000 | McClelland | 310/168 |
| 2004/0200654 A1 | * | 10/2004 | Hatsuda et al. | 180/243 |
| 2004/0217668 A1 | * | 11/2004 | Antonopoulos et al. | 310/168 |
| 2008/0054835 A1 | | 3/2008 | Tamaru | |
| 2008/0066980 A1 | * | 3/2008 | James | 180/65.5 |
| 2009/0021089 A1 | * | 1/2009 | Nashiki | 310/46 |

OTHER PUBLICATIONS

X.D. Xue, K. W. E. Cheng, et al.: 'Evaluation of Torque Sharing Functions for Torque Ripple Minimization in Switched Reluctance Motor Drives', IEEE IECON 2008.

X. D. Xue, K. W. E. Cheng, S. L. Ho, and K. F. Kwok, "Trigonometry-Based Numerical Method to Compute Nonlinear Magnetic Characteristics in Switched Reluctance Motors", IEEE Trans Magnetics, 2007, vol. 43, No. 4, Apr. 2007, pp. 1845-1848.

X.D.Xue, K.W.E.Cheng, S.L.Ho, "A Position Stepping Method for Predicting Performances of Switched Reluctance Motor Drives", IEEE Trans. Energy Conversion, vol. 22, No. 4, Dec. 2007, pp. 839-847.

X.D. Xue, K.W.E. Cheng and S.L. Ho, "Improvement of Power Factor in Switched Reluctance Motor Drives through Optimizing in Switching Angles", Electric Power Components and Systems., Dec. 2004, vol. 32, No. 12, pp. 1225-1238.

X. D. Xue, K. W. E. Cheng and S. L. Ho, "A Self-Training Numerical Method to Calculate the Magnetic Characteristics for Switched Reluctance Motor Drives", IEEE Trans on Magnetics, vol. 40 , Issue: 2 , Mar. 2004, pp. 734-737.

X.D. Xue , K.W.E. Cheng and S.L. Ho, "Simulation of Switched Reluctance Motor Drives Using Two-dimensional Bicubic Spline", IEEE Tran. Ene Con. Dec. 2002, vol. 17, Issue 4, pp. 471-477.

(Continued)

*Primary Examiner* — Frank Vanaman
(74) *Attorney, Agent, or Firm* — The Hong Kong Polytechnic University (57) ABSTRACT

A switched reluctance motor includes an inner stator having a plurality of stator poles with coil windings, the inner stator having a plurality of stator phases, an outer rotor configured to rotate around the inner stator, the outer rotor having a plurality of rotor poles, at least one position sensor configured to detect a position of the outer rotor, and a DC supply configured to sequentially supply current to excite the stator phases.

9 Claims, 12 Drawing Sheets

(56) References Cited

OTHER PUBLICATIONS

X.D.Xue, K.W.E.Cheng, S.L.Ho, "Online and Offline Rotary Regressive Analysis of Torque Estimator for SRM Drives", IEEE Trans Energy conversion, vol. 22, No. 4, Dec. 2007, pp. 810-818.

Jiongkang Lin, K.W. Eric Cheng, Zhu Zhang and Xiangdang Xue, "Experimental Investigation of In-wheel Switched Reluctance Motor Driving System for Future Electric Vehicles", 2009 3rd International Conference on Power Electronics Systems and Applications, May 20, 2009.

T.W. Ng, K.W.E. Cheng and X.D. Xue, "Computation of the In-Wheel Switched Reluctance Motor Inductance using Finite Element Method", 2009 3rd International Conference on Power Electronics Systems and Applications, May 20, 2009.

* cited by examiner

IN-WHEEL SWITCHED RELUCTANCE MOTOR DRIVE

BACKGROUND OF THE INVENTION

1. Field of the Invention

The present invention relates to electric motors, more particularly, to switched reluctance motors.

2. Description of the Related Art

Electric motors, along with power electronics technologies, play an important role in the development of Electric Vehicles (EV). In EV applications, electric motors are desired to have a high starting torque for initial acceleration, high torque density and high efficiency to extend battery life. Consequently, design of an electric motor for EV has to address to the above needs.

Recent advances in power electronic technologies have made Switched Reluctance Motor (SRM) an attractive candidate for Electric Vehicle (EV) due to advantages such as simple and rugged motor construction, low weight, low manufacturing cost, easy cooling, excellent power-speed characteristics, high torque density, high operating efficiency, inherent fault tolerance, direct-drive, high transmission efficiency, highly reliable and simple drive train system.

SRM is an electromagnetic motor that is capable of producing high torque at low speed, making it a good candidate for direct driving purposes. Its torque is produced by the tendency of its moveable part to move to a position where the inductance of the excited winding is maximized. In addition, SRM has a simple and firm construction with no windings or permanent magnets in the rotor. Due to the geometrical simplicity of SRM, it has a lower cost of manufacturing and maintenance than other types of electric motors, and its reliability and robustness appear to be improved. Furthermore, the driving power converter of SRM has an independent circuit for each phase, which provides the great advantages of inherent fault tolerance and the potential of high reliability.

Figure 1:
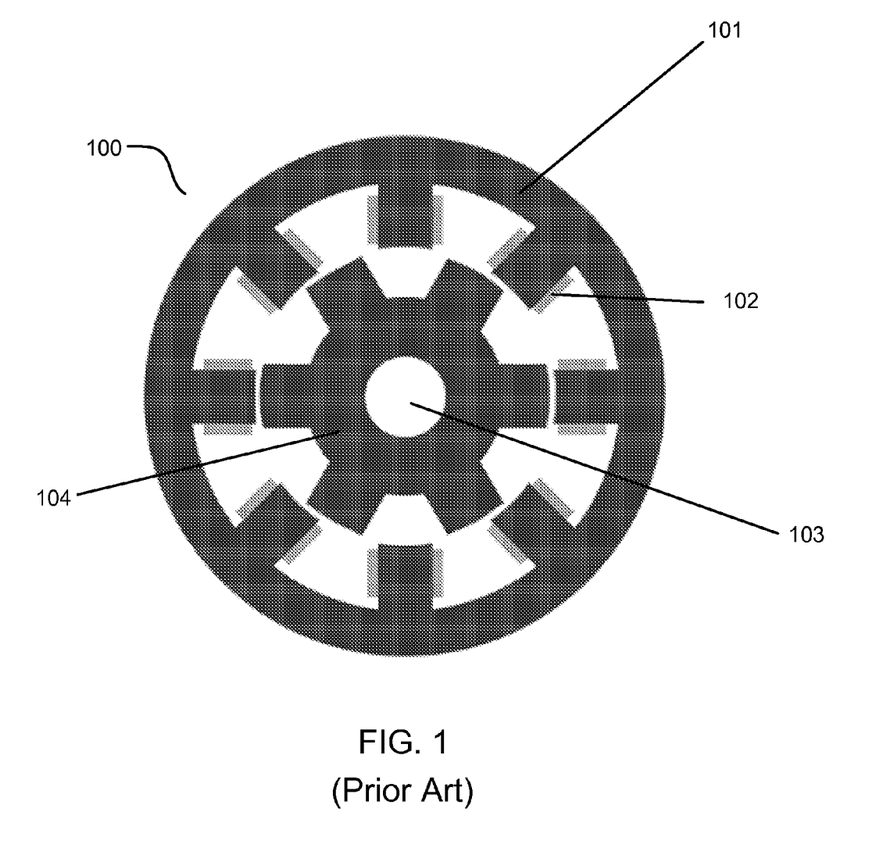
FIG. 1 illustrates a conventional four-phase switched reluctance motor.

FIG. 1 illustrates a conventional four-phase switched reluctance motor (SRM) 100 that includes a ring-like outer stator 101 having 8 stator poles, and an inner rotor 104 having 6 poles outwardly extended, and a shaft 103 fixed to the rotor 104. Each of the stator poles includes a coil winding 102. To obtain the rotational motion from the rotor 104, a stator phase (i.e., a pair of diametrically opposed stator poles) is excited, through supply of electric current, when rotor 104 is moving from an unaligned position towards an aligned position, and likewise, moving from an aligned position towards an unaligned position. In this regards, through sequential excitation of the stator phases, a continuous motoring motion can be performed in a clockwise or counterclockwise direction.

However, since the rotor of a conventional SRM is located inside of the stator, the rotation of the rotor cannot directly lead to the rotational of a wheel when it is used in an in-wheel design. Thus, a specially designed in-wheel SRM is needed.

SUMMARY OF THE INVENTION

According to an aspect of the present invention, a switched reluctance motor includes an inner stator having a plurality of stator poles with coil windings, the inner stator having a plurality of stator phases, an outer rotor configured to rotate around the inner stator, the outer rotor having a plurality of rotor poles, at least one position sensor configured to detect a position of the rotor, and a DC supply configured to sequentially supply current to excite the stator phases.

According to another aspect of the present invention, An in-wheel switched reluctance motor system includes a switched reluctance motor that includes an inner stator having a plurality of stator poles with coil winding, the inner stator having a plurality of stator phases, an outer rotor configured to rotate around the inner stator, the outer rotor having a plurality of rotor poles, at least one position sensor configured to detect a position of the rotor, and a DC supply configured to sequentially supply current to excite the stator phases; a controller configured to transmit drive signals to a power converter in response to receiving a position signal, a voltage signal, a current signal and a command signal; a power converter includes a plurality of phase branches for each of the stator phase, the phase branch is configured to receive drive signals from the controller and transfer electric energy between the DC supply and the corresponding stator phase.

Further features and aspects of the present invention will become apparent from the following description of exemplary embodiments with reference to the attached drawings.

BRIEF DESCRIPTION OF THE DRAWINGS

The accompanying drawings, which are incorporated in and constitute apart of the specification, illustrate embodiments of the invention and, together with the description, serve to explain the principles of the invention.

DESCRIPTION OF THE EMBODIMENTS

The accompanying drawings, which are incorporated in and constitute a part of the specification, illustrate embodiments of the invention and, together with the description, serve to explain the principles of the invention.

Figure 2A:
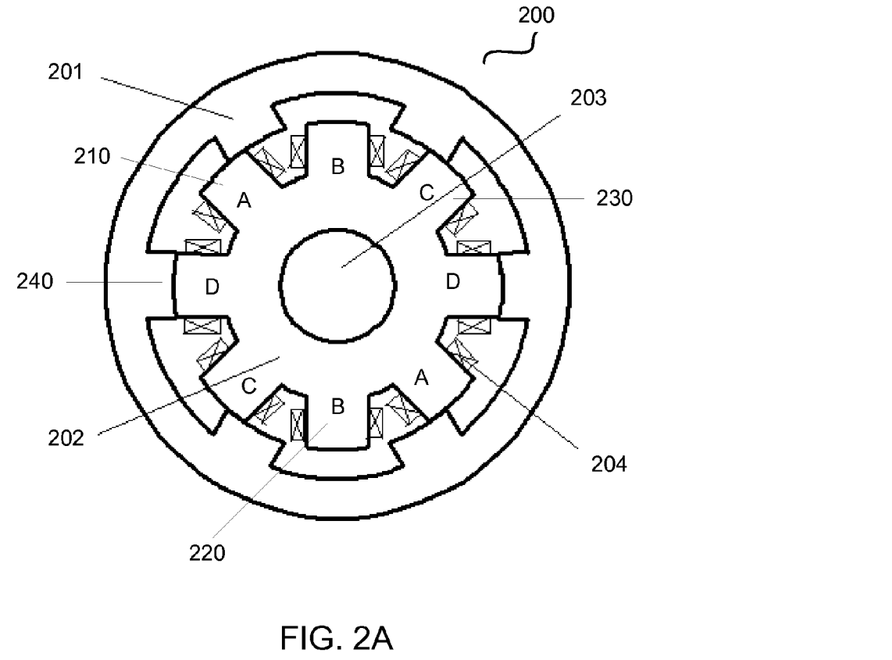
FIG. 2A illustrates an exemplary four-phase switched reluctance motor in accordance with an embodiment of the present invention.

FIG. 2A illustrates a configuration of a SRM 200 according to an embodiment of the present invention. The SRM 200 includes a ring-like outer rotor 201 and an inner stator 202. The outer rotor 201 is rotatable around the inner stationary stator 202. The rotor 201 having 6 rotor poles projecting inward and the stator having 8 (4 pairs) stator poles projecting outward of stator 202 towards the rotor poles. The stator poles are arranged such that each pair of poles is disposed opposite to each other. Also, a coil winding 204 is wound about each of the stator poles.

The SRM 200 is a four-phase stator having phase A 210, phase B 220, phase C 230, and phase D 240. The opposing stator poles share a common phase winding and define a respective stator phase. To obtain the rotational motion from the rotor 201, a stator phase is excited, through supply of electric current, when rotor 104 is moving from an unaligned position towards an aligned position, and likewise, moving from an aligned position towards an unaligned position. In this regards, through sequential excitation of the stator phases, a continuous motoring motion can be performed in a clockwise or counterclockwise direction. As the rotor 201 rotates, the rotor poles are adapted to sequentially face the stator poles through a small air-gap. The rotor 201 and stator 202 can be made of electrical steel such as silicon steel, or the like. SRM 200 may include a shaft 203 which is fixed to the stator 202.

Figure 2B:
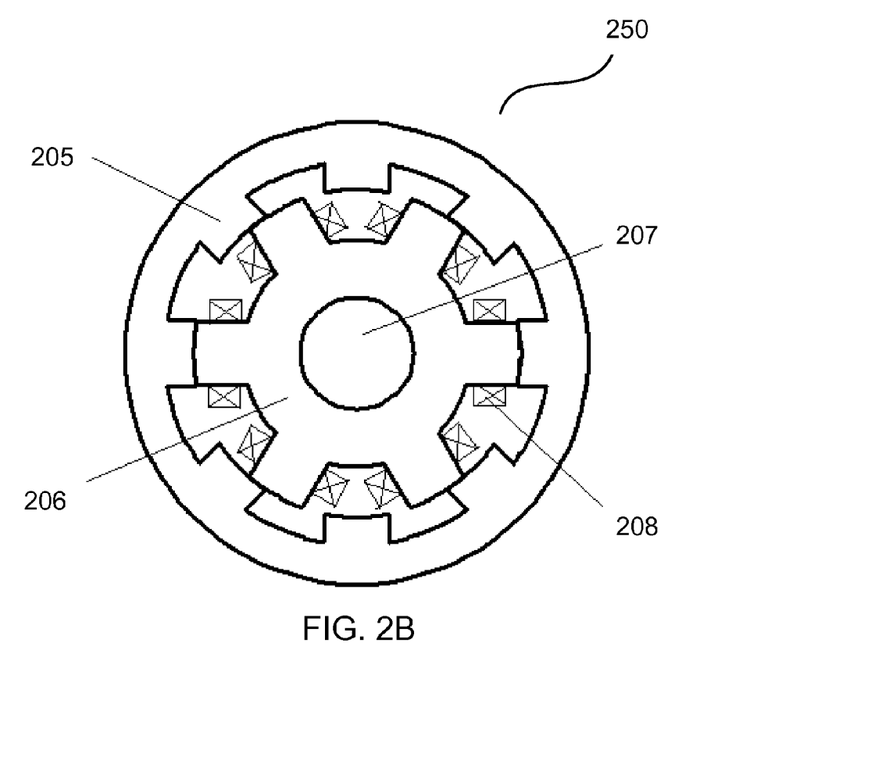
FIG. 2B illustrates an exemplary three-phase switched reluctance motor in accordance with an embodiment of the present invention.

FIG. 2B illustrates the configuration of a three-phase SRM 250 according to an embodiment of the present invention. FIG. 2B includes a ring-like outer rotor 205 and an inner stator 206. The rotor 205 having 8 rotor poles projecting inward and the stator 206 having 6 (3 pairs) stator poles projecting outward of stator 206 toward the rotor poles. The stator poles are arranged such that each pair of poles is disposed opposite to each other. Also, each of the stator poles includes a coil winding 208. The rotor 205 and stator 206 can be made of electrical steel such as silicon steel, or the like. SRM 210 also may include a shaft 207 which is fixed to the stator 206. While FIGS. 2A and 2B illustrate two specific types of SRMs, the present invention may be applicable to various types of SRMs having a varying number of stator poles and a varying number of rotor poles.

Figure 3:
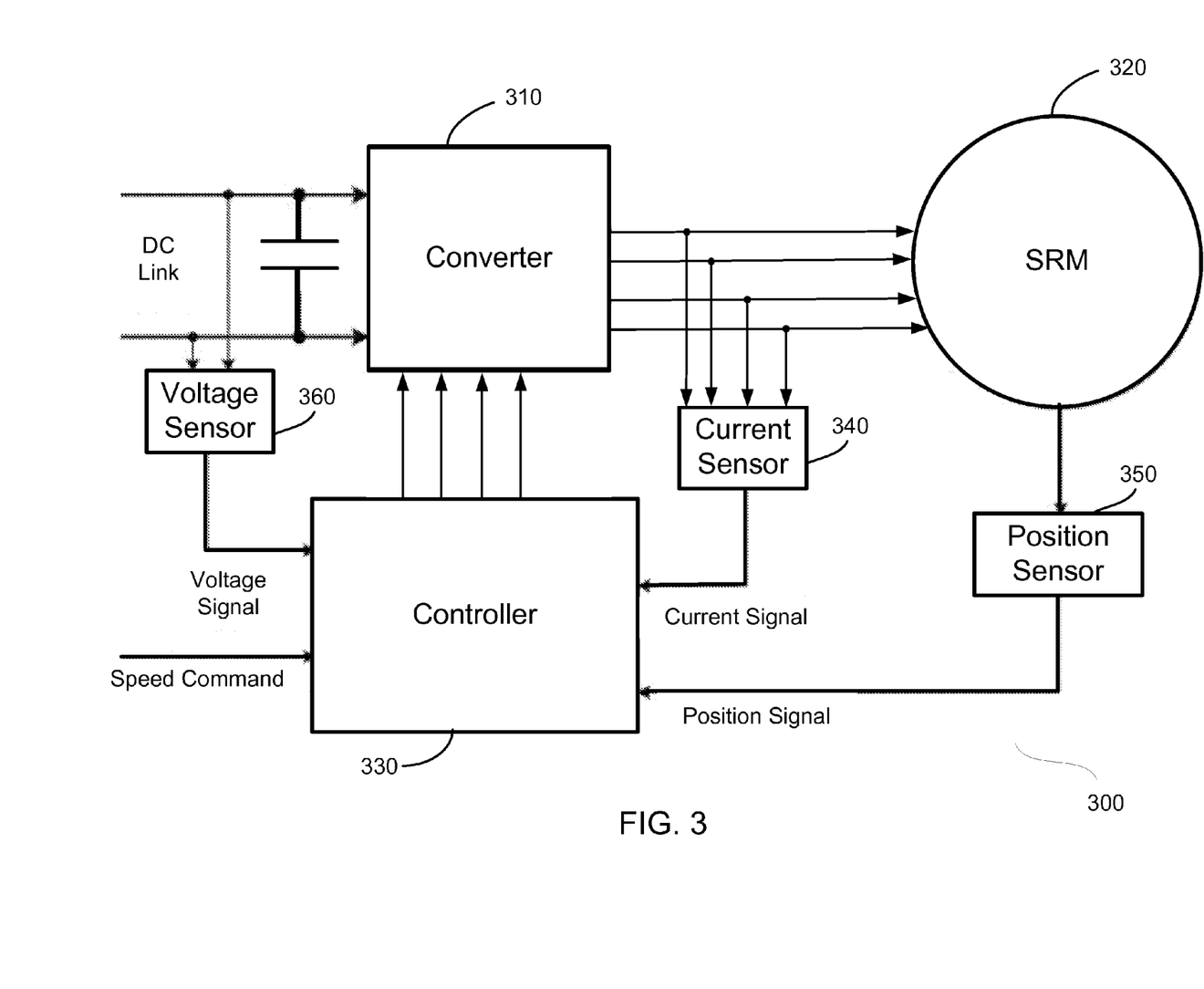
FIG. 3 illustrates an exemplary configuration of a SRM system.

FIG. 3 illustrates a configuration of a SRM system 300 in accordance with an embodiment of the present invention. As shown in FIG. 3, a DC source, which can be a DC supply or batteries, is connected to a power converter 310. Position sensor 350, current sensor 340 and voltage sensor 360 are included in the SRM system 300. The current sensor 340 and voltage sensor 360 are configured to communicate with the controller 330 to prevent the SRM system 330 from over-current and over-voltage.

Voltage sensor detects the input voltage from a DC source or a battery, and transmits a voltage signal to the controller 330. The current sensor 340 is provided for detecting the phase current when current is supplied to the coil windings of the SRM 320.

Figure 6A:
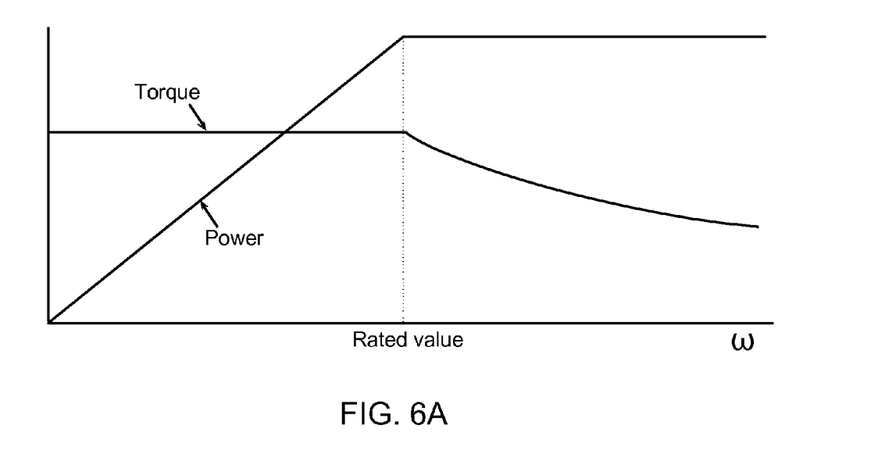
FIG. 6A illustrates a constant torque/constant power curve.
Figure 6B:
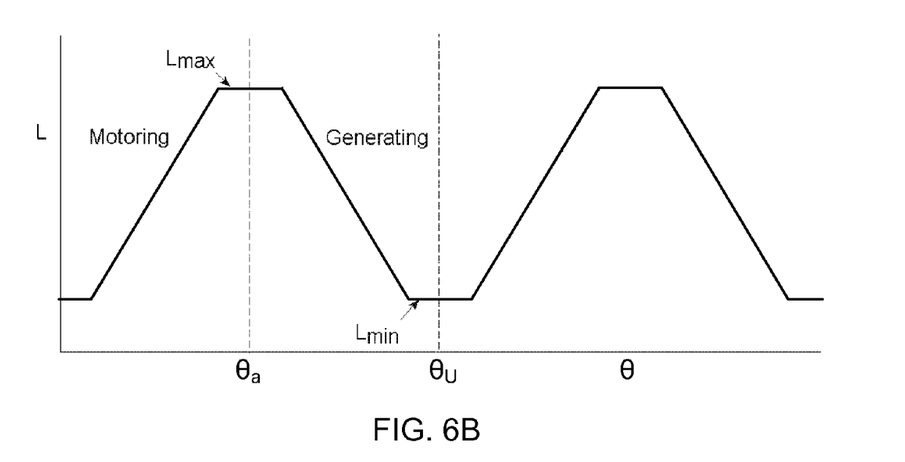
FIG. 6B illustrates a theoretical inductance profile of the SRM system.

SRM 320 can be the SRM as illustrated in FIG. 2A or FIG. 2B with a rating power of about 5 kW. The inductance (L) of the machine varies with the position of the rotor. For instance, as illustrated in FIG. 6B, the phase inductance is at a minimum value when the rotor poles are at a fully unaligned position ($\theta_U$). When the rotor poles move from a fully unaligned position ($\theta_U$) to a fully aligned position ($\theta_A$), the phase inductance is increased to a maximum inductance value when the rotor poles are at a fully aligned position. This period is known as a motoring period. In contrast, when the rotor poles move from a fully aligned position to a fully unaligned position, the phase inductance is decreased to a minimum inductance value. This period is known as a generating period.

The variations of flux and torque of the SRM, depend not only on the current value, but also on the rotor position. The following equations show the relationships of flux $\lambda$ and torque T with position $\theta$ and current i.

$$\lambda(i, \theta) = L(i, \theta) i \quad (1)$$

$$T(i, \theta) = \frac{1}{2} i^2 \frac{dL}{d\theta} i \quad (2)$$

Since inductance L is a nonlinear function of 6 for its saturation at fully aligned position, the flux $\lambda$ and torque T are each a nonlinear function of $\theta$ and i.

Figure 4:
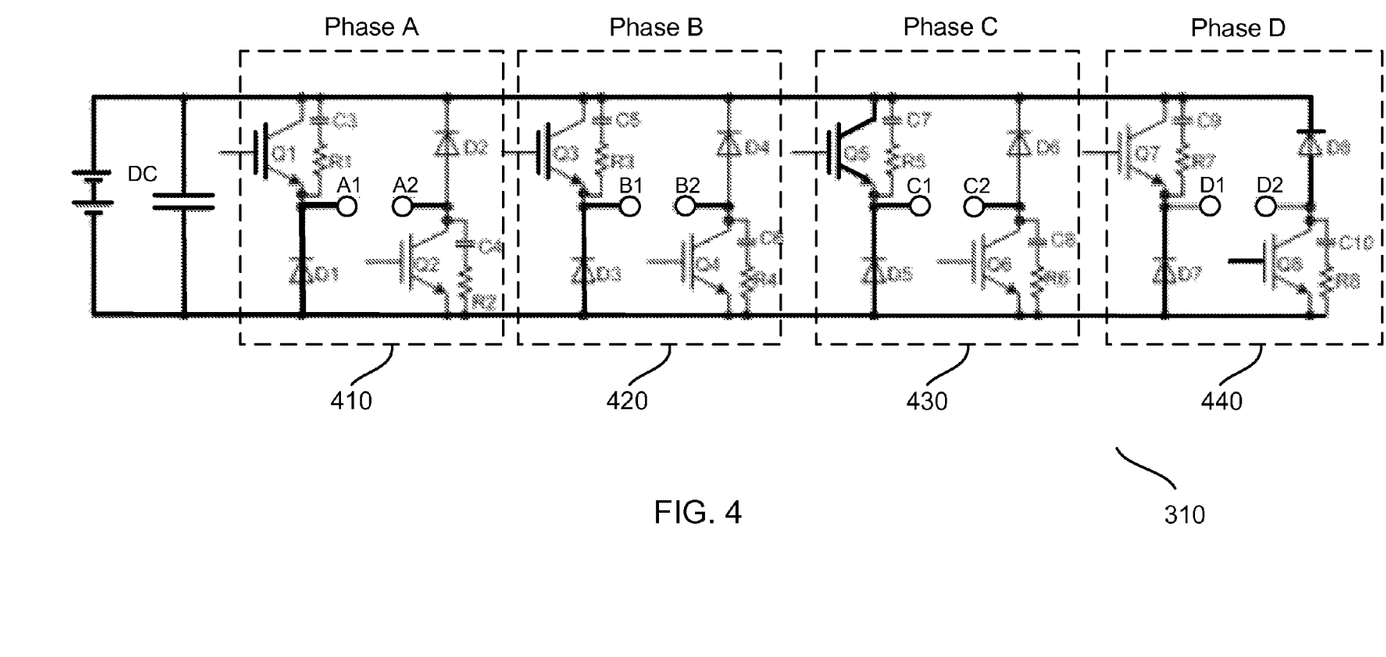
FIG. 4 illustrates an exemplary four-phase power converter.

FIG. 4 illustrates an exemplary configuration of a power converter 310 for driving the four stator phases of the SRM 320. The power converter 310 supply currents to a pair of coil phase windings and energize the pair of coil phase windings. As shown in FIG. 4, the power converter includes four independent phase branches for driving the four phases of the four-phase SRM. For example, phase branches 410, 420, 430, and 440 are configured to drive phase A, phase B, phase C, and phase D of the SRM 320, respectively. The winding of phase A is connected with terminals A1 and A2, the winding of phase B is connected with terminals B1 and B2, and so forth.

In FIG. 4, eight insulated gate bipolar transistors (IGBTs) are used as the switches for the power converter. During the conducting period of phase A, Q1 and Q2 are switched on and current flows from Q1 to Q2 through winding of phase A. When a chopping is needed to decrease the phase current, Q1 is turned off while Q2 remains on, and the current flows through Q2 and D1. When phase A is turned off, both Q1 and Q2 are switched off, and the current flows through D1 and D2 is decreased to zero. Phase branches 420, 430, and 440 performs similar function as phase branch 410, hence, the description thereof is omitted. While the power converter configuration is illustrated in connection with FIG. 4, the control mechanism of the present invention, however, will work with various converter topologies.

Controller 330 is capable of controlling the transfer of electric energy between the DC source and the corresponding stator phase. It is a high performance digital signal controller, for example, a 32-bit digital signal processor TMS320F2808 with high performance static CMOS technology by Texas Instruments Incorporated may be utilized. Controller 330 is configured to receive position signal from the position sensor 350, current signal from the current sensor 340, and voltage signal form the voltage sensor 360. Also, controller 330 is configured to receive a speed command from an external source (not shown). The speed command instructs the SRM 320 to motor or to stop. Upon receiving the signals from the various sensors and speed command, the controller 330 generates and transmits control signals to the power converter 310 for driving the SRM 320.

Figure 5:
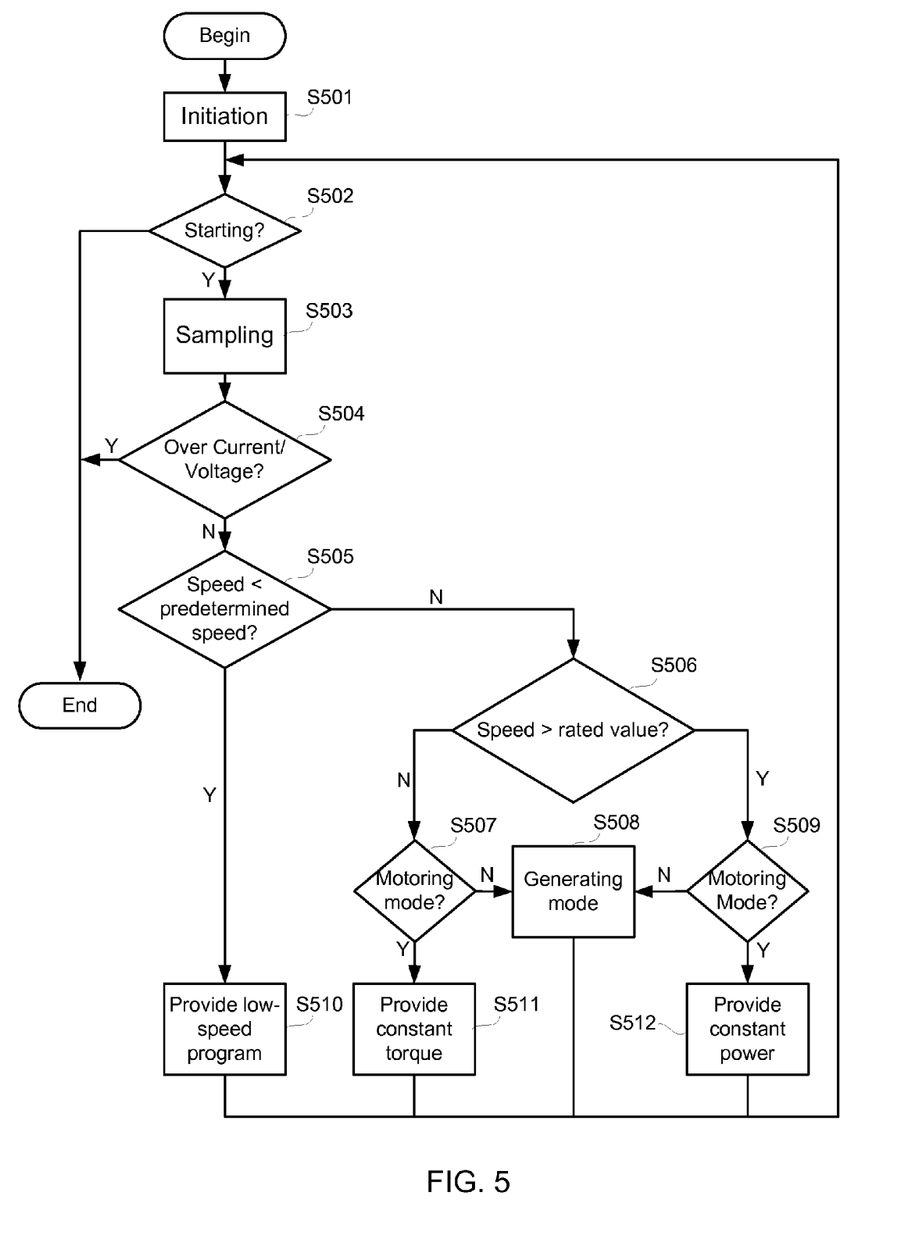
FIG. 5 illustrates an exemplary control flow in accordance with an embodiment of the present invention.

An exemplary control flow of the SRM system 300 is illustrated in FIG. 5. In step S501, the SRM system 300 begins initiation. During initiation, the DC power source supply voltage and activate the SRM system. Then, in step S502, the controller 330 determines whether starting command is received by the controller 330. If a starting command is received (YES in step S502), the process flow proceeds to step S503. Otherwise, the process is terminated. During sampling (S503), the position signal, voltage signal and command signal are acquired by the controller 330. Then, the controller 330 determines whether over-current or over-voltage has occurred by comparing the phase current and DC link voltage with the predetermined values (S504). Thus, the controller 330 ensures the SRM system is operating in a safe condition. Then, a position signal detected by the position sensor 350 can be used to calculate the rotational speed of SRM 320. In step S505, the controller 330 determines whether the rotational speed of the rotor exceeds a predetermined speed (e.g. 30 rpm). If the speed is equal to or below the predetermined speed, the flow proceeds to step S510 to start a program for operating the SRM at a low speed.

If the speed exceeds the predetermined speed, the flow proceeds to step S506 to determine whether the rotational speed of SRM 320 is greater than a rated value (e.g. 1000 rpm). In a case where the rotational speed of rotor is less than or equal to the rated speed, the controller 330 determines whether SRM 320 is in a motoring mode (step S507). If the controller is in a motoring mode (i.e., the rotor is moving from an unaligned position to an aligned position), the controller 330 instructs the power converter 310 to provide constant torque control (constant torque mode) to the SRM in step S511. If it is not in a motoring mode, the controller 330 sends control signals to the SRM for operating in a generating mode (S508), and then the process returns to step S502.

On the other hand, in a case where the rotational speed of the rotor is greater than the rated speed, the controller 330 determines whether the SRM is motoring (step S509). If the SRM 320 is motoring, the controller 330 instructs the power converter to provide constant power control (constant power mode) to the SRM 320 in step S512. If it is not in a motoring mode, the controller 330 sends control signals to the SRM for operating in a generating mode (S508) (i.e., the rotor is moving from an aligned position to an unaligned position), and then the process returns to step S502.

The relationship between constant power and constant torque will be discussed in more details in connection with FIG. 6A. FIG. 6A illustrates an exemplary constant torque/constant power curve. Constant torque/constant power curve is the basic characteristic of electrical machines. Base speed is maximum speed allowed while rated torque is kept. As shown in FIG. 6A, when rotational speed is below the rated value, torque remains constant while power increases linearly. The maximum power is achieved when the SRM rotational speed reaches the rated value. Then, the torque decreases to keep the power at a maximum value.

Constant torque/constant power curve is an indication of the performance of an SRM. Based on this curve, torque control and power control can be performed.

Figure 7:
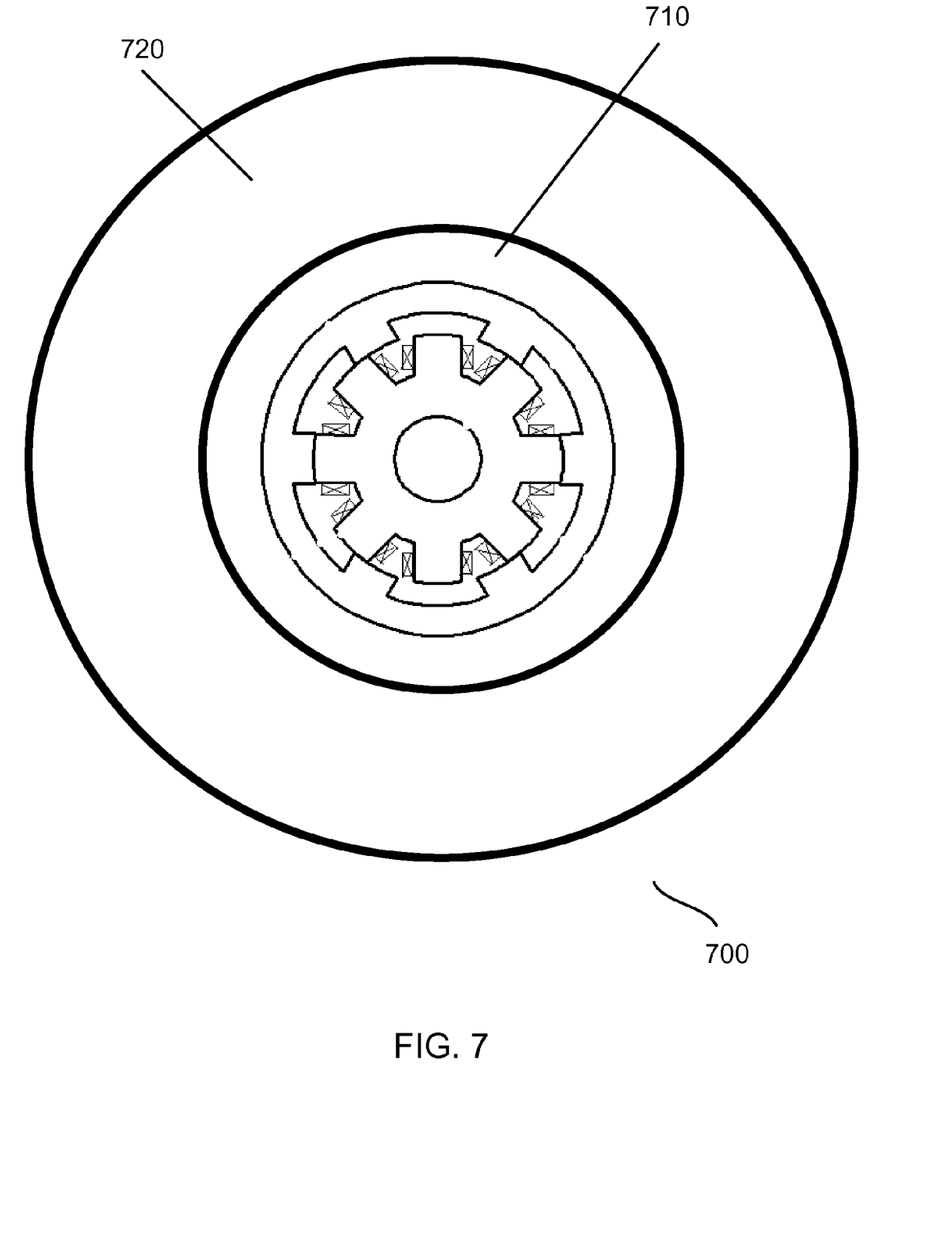
FIG. 7 illustrates an in-wheel SRM design in accordance with an embodiment of the present invention.

In accordance with an embodiment of the present invention, the rotor of the SRM is attached to the rim of a wheel as shown in FIG. 7. FIG. 7 illustrates a SRM 700 with a rim 710 and tire 720. In this embodiment, the outer rotor of the SRM is fixed to the rim 710 so that the rotation of the outer rotor leads the entire wheel to rotate. In another embodiment, the outer rotor and the rim may be integrated as a unit.

Figure 8:
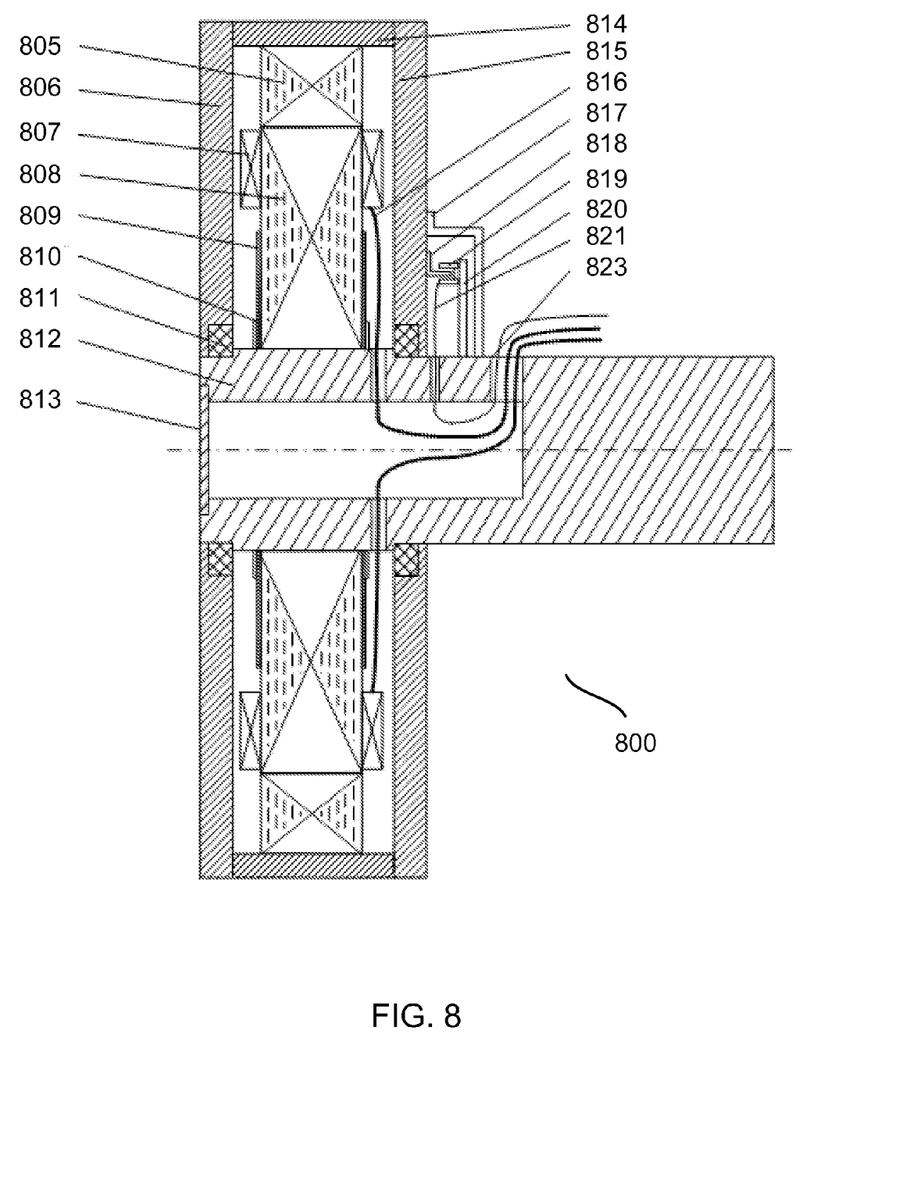
FIG. 8 illustrates a cross-sectional view of the SRM of FIG. 2A or FIG. 2B.

FIG. 8 is a cross-sectional view of an SRM according to the present invention. The SRM 800 can be an SRM as illustrated in FIG. 2A or 2B. The SRM 800 includes a rotor 805, a front motor cover 806, an inner stator 808 with coil windings 807 wound about its stator poles, a press plate 809, a press ring 810, bearings 811, a steel shaft 812 having a hollow interior for electrical wirings, a front airproof disc 813 for covering the steel shaft 812, a cylinder crust 814, a rear motor cover 815, winding cables 816 for supplying electrical currents to the coiled windings 807.

The SRM 800 also includes a position sensor 819 that is capable of acquiring and detecting the rotor position information. Position sensor 819 is an optical sensor such as an optocoupler, however, other types of sensors may also be utilized. The position sensor 819 includes a protective sensor cover 817, a sensor disc 818, a sensor securing stand 820, and a cable 821 for receiving and transmitting data signals. The SRM may include numerous holes and cavities for outputting cables depending on specific designs. Reference numeral 823 represents the hole for the output cables.

SRM Design Optimization

From the requirements of EVs on electric motors, three criterions are used to evaluate design of SRMs in EVs, namely the average torque, the average torque per copper loss and the average torque per motor core volume. These criterions imply torque, efficiency and torque density, respectively.

The computation of the average torque is given as $$T_{ave} = \frac{(W_a - W_u)N_s N_r}{4\pi} \quad (3)$$

$$W_a = \int_0^{I_r} L_a i \, di \quad (4)$$

$$W_u = \frac{1}{2} I_r^2 L_u \quad (5)$$

where $I_r$ represents the rated phase current, $L_a$ represents the inductance at the fully aligned position and $L_u$ represents the inductance at the completely unaligned position.

The copper loss $P_{cu}$ can be computed as $$P_{cu} = I_r^2 R_{ph} \quad (6)$$

where $R_{ph}$ represents the phase resistance.

Hence, the average torque per copper loss (TP) can be expressed as $$TP = \frac{T_{ave}}{P_{cu}} \quad (7)$$

and the motor lamination volume ($V_{core}$) can be calculated as $$V_{core} = V_s + V_r \quad (8)$$

where $V_s$ represents the volume of stator lamination and $V_r$ represents the volume of rotor lamination.

Consequently, the average torque per motor lamination volume (TV) is determined as $$TV = \frac{T_{ave}}{V_{core}} \quad (9)$$

The above criterions are selected as three design objectives of SRMs. Clearly, it is difficult to simultaneously maximize these objectives. Consequently, the correct compromise between maximum average torque, maximum average torque per copper loss and maximum average torque per motor lamination volume, is defined as the optimization function, which is expressed as $$F_{opt} = \max\left\{ w_t \frac{T_{ave}}{T_b} + w_{tp} \frac{TP}{TP_b} + w_{tv} \frac{TV}{TV_b} \right\} \quad (10)$$

$$T_b = \max\{T_{ave}\}$$

$$TP_b = \max\{TP\} \quad (12)$$

$$TV_b = \max\{TV\} \quad (13)$$

$$w_t + w_{tp} + w_{tv} = 1 \quad (14)$$

where $T_{ave}$ denotes the average torque, TP denotes the average torque per copper loss, TV denotes the average torque per motor lamination volume, $w_t$, $w_{tp}$ and $w_{tv}$ represents the weight factors of the average torque, the average torque per copper loss and the average torque per motor lamination volume, respectively. $T_b$ represents the base values of the average torque, $TP_b$ represents the base value of the average torque per copper loss, and $TV_b$ represents the base value of the average torque per motor lamination volume.

It can be seen from (10) that the optimization with three objectives has been simplified to an optimization function by using three weight factors and three base values. The maximum value of the optimization objective function is unity. Various weight factors indicate the shares, which are taken up by the average torque, torque per copper loss and torque per motor lamination volume in the objective function. For instance, its weight factor may be selected a larger value than other two factors if one of three objectives is desired to be emphasized.

The base value of the average torque can be determined through optimizing the defined parameters when maximizing the average torque. Similarly, the base value of the average torque per copper loss can be computed via optimizing the defined parameters when maximizing the average torque per copper loss, and the base value of the average torque per motor lamination volume can be determined through optimizing the defined parameters when maximizing the average torque per motor core.

Figure 9:
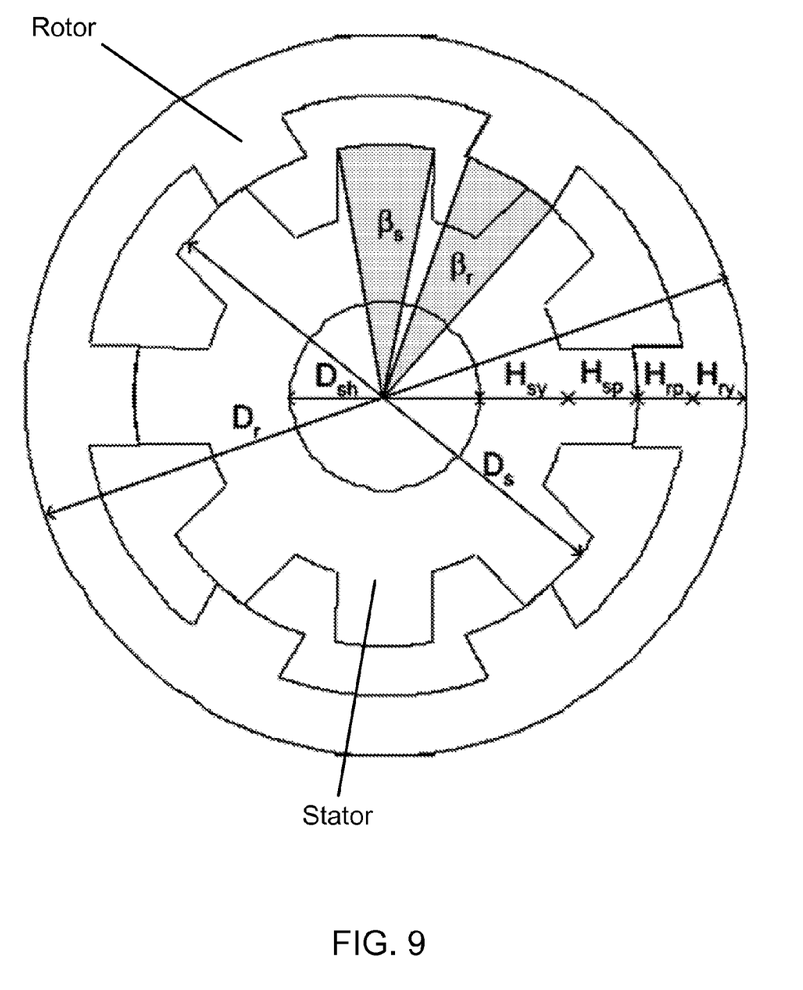
FIG. 9 illustrates the geometrical parameters of a stator and a rotor of a four-phase in-wheel SRM.

FIG. 9 illustrates an exemplary configuration of the stator and rotor of a four-phase SRM. In principle, all the geometrical design parameters could be selected as the optimized parameters. The geometrical design parameters of an in-wheel SRM mainly include the outer diameter of rotor ($D_r$), the thickness of rotor back iron ($H_{ry}$), the height of rotor pole ($H_{rp}$), the pole arc angle of rotor ($\beta_r$), the length of air gap ($L_g$), the outer diameter of stator ($D_s$), the height of stator pole ($H_{sp}$), the thickness of stator back iron ($H_{sy}$), the pole arc angle of stator ($\beta_s$), the outer diameter of shaft ($D_{sh}$), and the length of stator lamination ($L_s$).

For direct-drive in-wheel SRMs, the outer diameter of rotor depends on the size of EV rims and thus it cannot be selected as the optimized parameter. Similarly, the length of stator lamination will be limited by the EV size and consequently it is also not suitable for the optimized parameter. For EVs, the short length of stator lamination is desired. Generally, it is expected that the length of air gap between the rotor and the stator should be made as short as possible. Clearly, the length of air gap should not be considered as the optimized parameter. Due to the magnetic saturation in motor steel lamination, the outer diameter of stator, the height of stator pole, the thickness of stator back iron, the height of rotor pole, and the thickness of rotor back iron should not be regarded as the optimized parameters. Different from other types of traditional motors, the stator pole arc angle and the rotor pole arc angle are two flexible design parameters for SRMs. The values of both have significant effect on the average torque. Therefore, the stator pole arc angle and the rotor pole arc angle can be selected as the optimized parameters.

Therefore, the objective function can be expressed as $$F_{obj}(\beta_s, \beta_r) = w_t \frac{T_{ave}}{T_b} + w_{tp} \frac{TP}{TP_b} + w_{tv} \frac{TV}{TV_b} \quad (15)$$

Consequently, the optimization function is defined as $$F_{opt}(\beta_s^{opt}, \beta_r^{opt}) = \max\left\{w_t \frac{T_{ave}}{T_b} + w_{tp} \frac{TP}{TP_b} + w_{tv} \frac{TV}{TV_b}\right\} \quad (16)$$

On the one hand, in order to obtain maximum average torque, the stator and rotor pole arc angles ($\beta_s$ and $\beta_r$) should be limited by the constraints, which are given as follows:

$$0.4 < \frac{\beta_s}{\theta_{sp}} < 0.5 \quad (17)$$

$$0.3 < \frac{\beta_r}{\theta_{rp}} < 0.45 \quad (18)$$

$$\theta_{sp} = \frac{360}{N_s} \quad (19)$$

$$\theta_{rp} = \frac{360}{N_r} \quad (20)$$

where $\theta_{sp}$ represents the stator pole pitch angle, $\theta_{rp}$ represents the rotor pole pitch angle, $N_s$ represents the number of stator poles, and $N_r$ represents the number of rotor poles.

On the other hand, the inductance at the fully aligned position gives rise to the peak current possible in the torque generation. Furthermore, the fully aligned inductance is sensitive to the ratio of the rotor arc angle to the stator pole arc angle. If only a variation of 15% in the fully aligned inductance value is allowed and the self-starting requirement is considered, the rotor pole arc angle to the stator pole arc angle should be confined in the following range:

$$1.0 < \frac{\beta_r}{\beta_s} \leq 1.2 \quad (21)$$

Due to the requirement of self-starting, the minimum stator pole arc angle is:

$$\beta_s > \frac{720}{N_s N_r} \quad (22)$$

In summary, the optimization of the stator and rotor pole arc angles must be constrained by the equations from (17) to (22).

Figure 11:
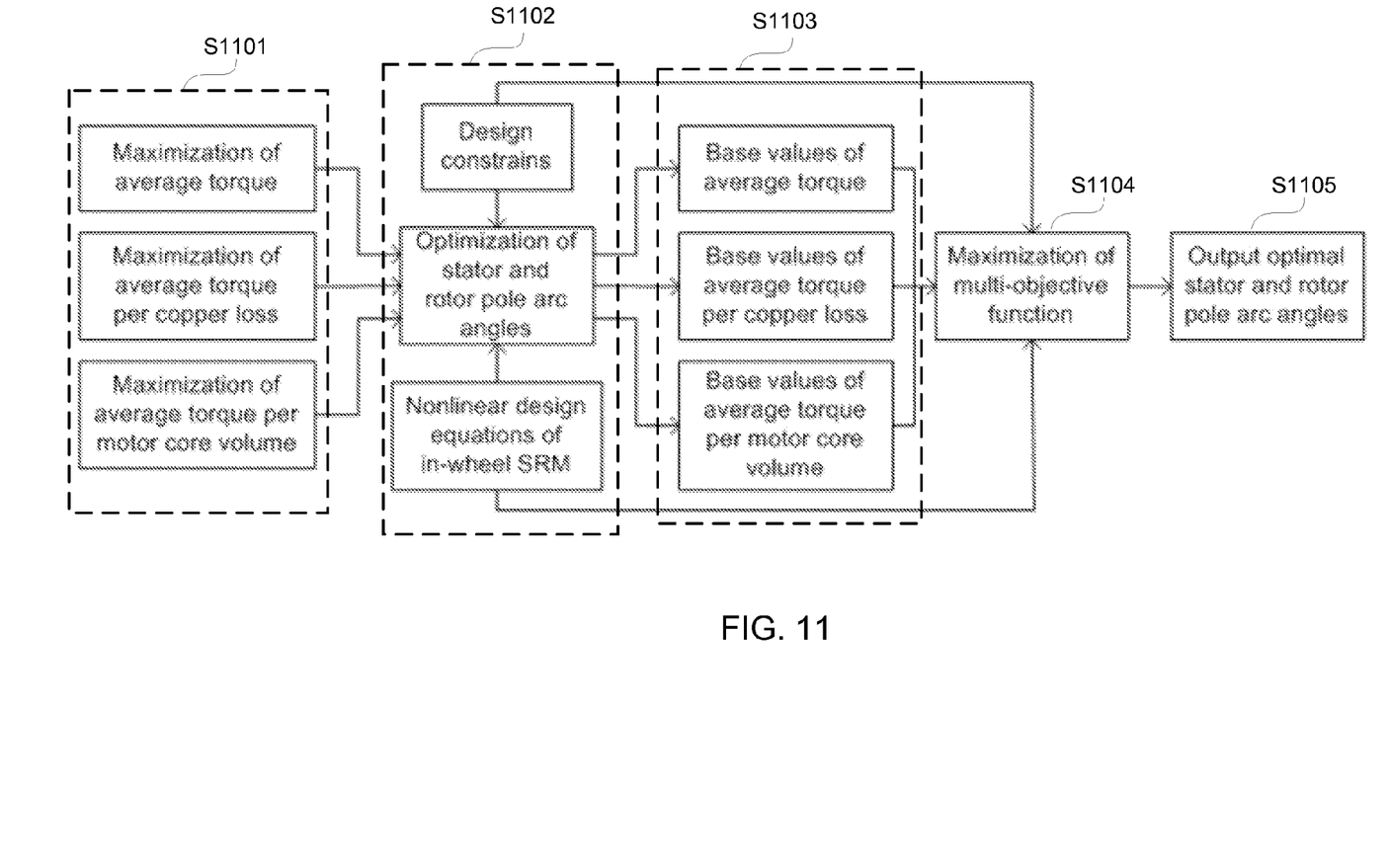
FIG. 11 is a flow diagram for multi-objective optimization according to an embodiment of the present invention.

The block diagram in FIG. 11 illustrates the algorithm of the present multi-objective optimization. At first, in step S1101, the stator and rotor pole arc angles are optimized to maximize three individual objective optimization functions, which are the average torque, the average torque per copper loss and the average torque per motor core volume. Then, in step S1102, using design constrains and the non-linear design equations of in-wheel SRM, the base values of the average torque, the average torque per copper loss and the average torque per motor core volume are computed in step S1103. After that, the weight factors are selected and the multi-objective optimization function is established in step S1104.

Finally, the stator and rotor pole arc angles are optimized in order to maximize the multi-objective function in step S1105.

In-wheel SRM drives can be used to directly drive EV wheels. Thus, the rated power of an in-wheel SRM depends on the rated output power of an EV and the number of the motors.

For SRMs, the number of phases depends on the number of stator poles. In general, the number of phases is the half number of stator poles. For instance, the number of phases is four if the stator has eight poles and the rotor has six poles. A smaller number of phases results in the simpler converter topology and hence reduces the converter cost, but increases the torque ripple. On the other hand, larger number of poles will result in thinner stator and rotor yokes, and thus reduces the weight of the motor. An SRM with larger number of poles requires a smaller air-gap to maintain the same performance. However, the origin of acoustic noise in SRMs is the radial force which increases inversely with the air-gap. Furthermore, SRM drives with larger number of poles operate with higher electrical frequency at the same motor speed, which will increase the losses dependent on the electrical frequency. With all the above factors, three-phase and four-phase SRMs can be utilized for EVs. Three-phase SRMs have the inherent problem of torque dips that will invariably cause higher torque ripple at low speed compared to four-phase SRMs. Four-phase SRM drives will produce smaller DC current ripple than three-phase SRM drives. Developed techniques of torque control have been applied to minimize torque ripple in the constant torque range for SRM drives. It should be pointed out that torque ripple cannot be eliminated in the constant power range for any type of SRM drives.

The maximum motor speed can be determined by the maximum EV velocity and the outer diameter of EV wheels. Suppose that the maximum motor speed is $\omega_{max}$ (rpm), the outer diameter of the EV wheels is $d_{ev}$ (m), and the maximum vehicle velocity is $v_{max}$ (km/h), for EVs directly driven by in-wheel SRMs, the maximum motor speed can be computed as $$\omega_{max} = \frac{50}{3\pi} \frac{v_{max}}{d_{ev}} \quad (23)$$

The output characteristics of EVs require that the rated motor speed is as low as possible and the maximum motor speed is as high as possible. However, the maximum motor speed is limited by the maximum vehicle velocity and the outer diameter of wheels. Furthermore, it should be emphasized that the lower rated motor speed will result in a larger motor size and more motor weight for the same rated power. Hence, the compromise between the good EV characteristics (low rated speed) and the limitation of motor size has to be chosen.

EXAMPLE

In this example, two 5 kW in-wheel SRMs are determined to directly drive EV wheels. From the discussion in the last section, the design requirements are proposed as follows.
Rated power=5 kW
Number of phases=4
Number of stator poles=8
Number of rotor poles=6
Rated motor speed=1000 rpm
DC link voltage=240 V Taking account of the constrains on the stator pole arc angle and rotor pole arc angle, which are given by the equations from (17) to (22), the stator pole arc angle has to be confine as $$18 < \beta_s < 22.5 \quad (24)$$

Consequently, the rotor pole arc angle has to be selected in the range, given as $$18 < \beta_r < 27 \quad (25)$$

Defining the stator and rotor pole arc angles in degree in integers, the stator and rotor pole arc angles for the present design requirements must vary with the specified values, which are shown in Table I.

TABLE I

VALUES OF STATOR AND ROTOR POLE ARC ANGLES

| $\beta_s$ (degree) | $\beta_r$ (degree) |
|---|---|
| 19 | 20, 21, 22 |
| 20 | 21, 22, 23, 24 |
| 21 | 22, 23, 24, 25 |
| 22 | 23, 24, 25, 26 |

The obtained numbers can be used to describe the combination of the stator and rotor pole arc angles, as shown in Table II.

TABLE II

COMBINATION OF STATOR AND ROTOR POLE ARC ANGLES

| | \multicolumn{8}{c}{Number} |
|---|---|---|---|---|---|---|---|---|
| | 1 | 2 | 3 | 4 | 5 | 6 | 7 | 8 |
| $\beta_s$ | 19 | 19 | 19 | 20 | 20 | 20 | 20 | 21 |
| $\beta_r$ | 20 | 21 | 22 | 21 | 22 | 23 | 24 | 22 |

| | Number | | | | | | |
|---|---|---|---|---|---|---|---|
| | 9 | 10 | 11 | 12 | 13 | 14 | 15 |
| $\beta_s$ | 21 | 21 | 21 | 22 | 22 | 22 | 22 |
| $\beta_r$ | 23 | 24 | 25 | 23 | 24 | 25 | 26 |

Figure 10A:
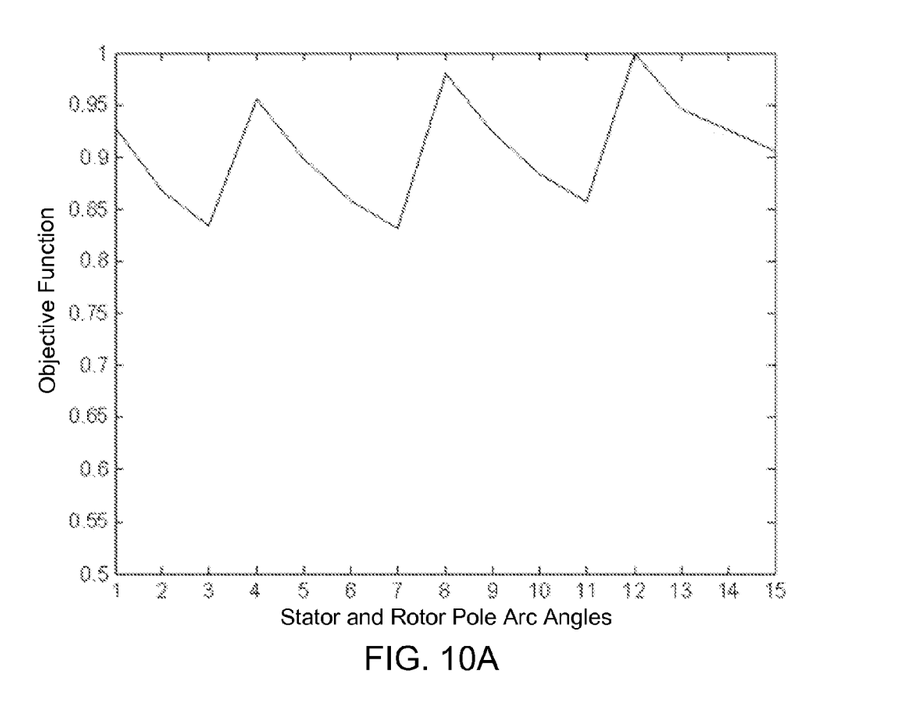
FIG. 10A illustrates objective function including only average torque.
Figure 10B:
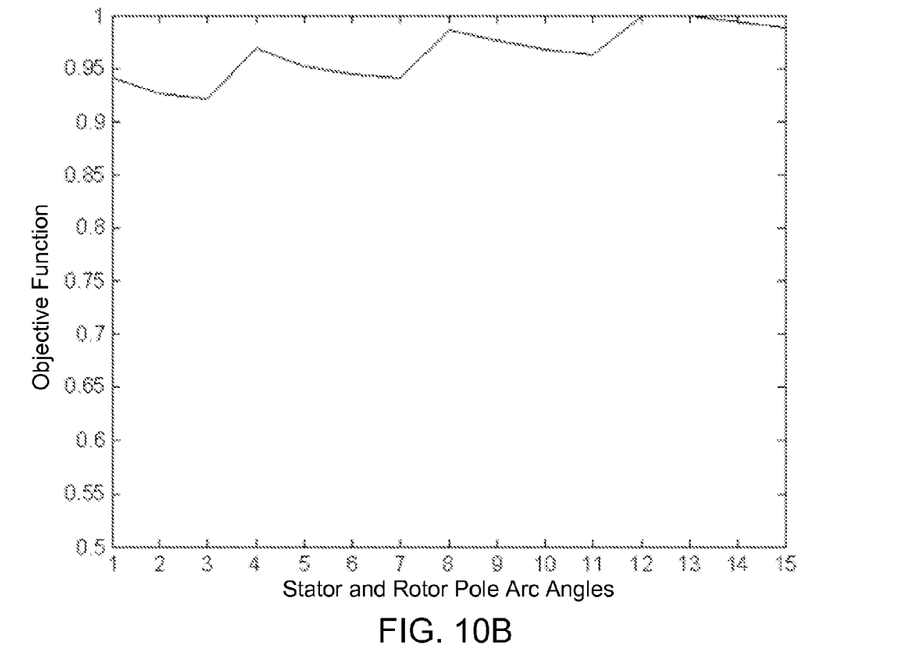
FIG. 10B illustrates objective function including only average torque per copper loss.
Figure 10C:
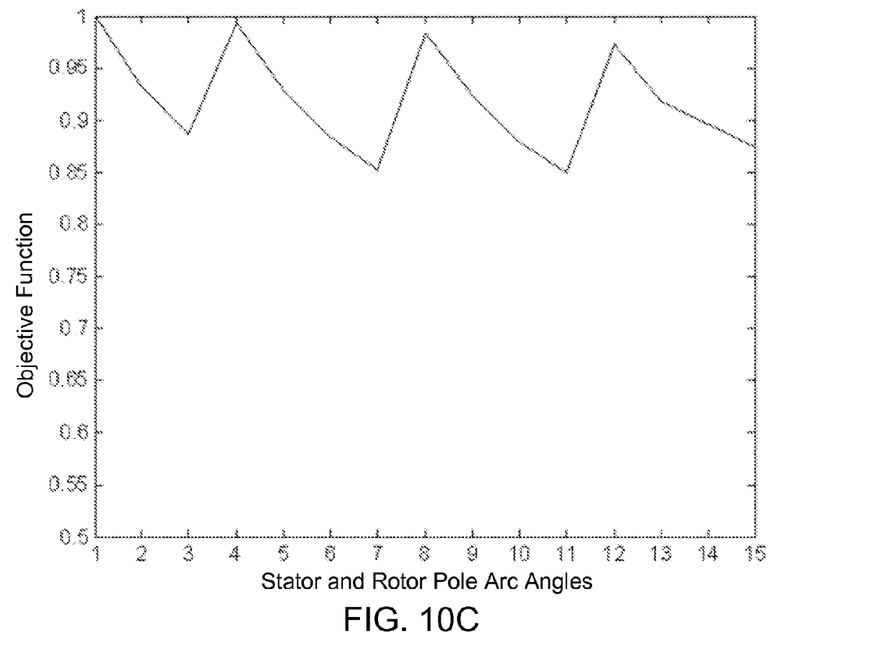
FIG. 10C illustrates objective function including only average torque per motor lamination volume.
Figure 10D:
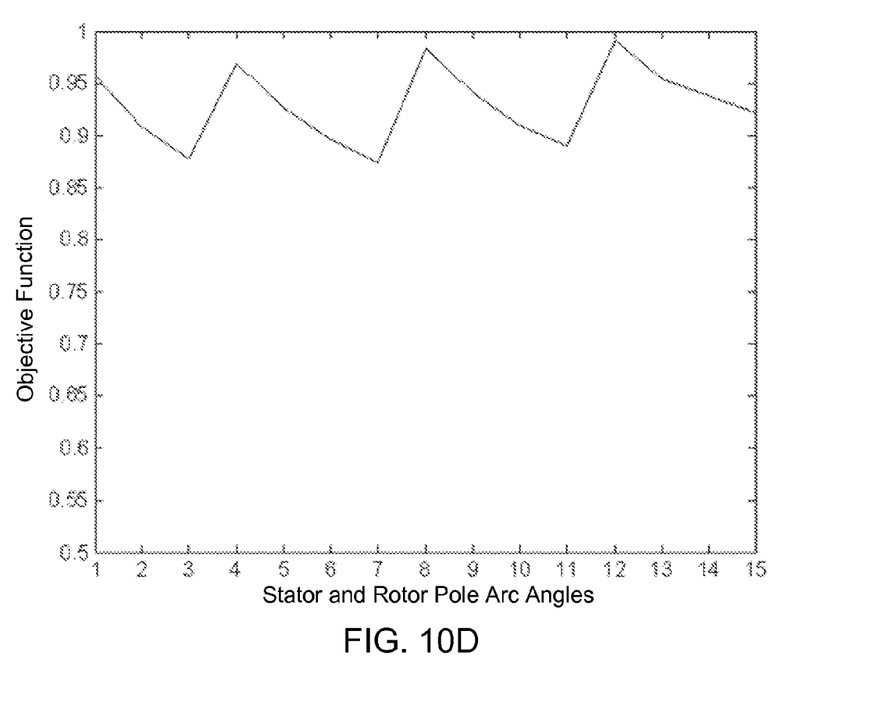
FIG. 10D illustrates multi-objective function at given weight factors $w_t = w_{tp} = w_{tv} = 1/3$.

FIG. 10A illustrates the change of the objective function only including the average torque. The distribution of the objective function only including average torque per copper loss is illustrated in FIG. 10B. FIG. 10C depicts the variation of the objective function versus the stator and rotor pole arc angles if the objective function includes only the average torque per motor lamination volume. The change of the objective function with the stator and rotor pole arc angles are illustrated in FIG. 10D, if three weight factors are determined as $w_t = w_{tp} = w_{tv} = 1/3$.

It can be observed from FIGS. 10A to 10D that the maximum objective function values and optimal stator and rotor pole arc angles can be found for the given weight factors.

Table III shows the optimization results with various weight factors. It can be seen that (i) the optimal stator and rotor pole arc angles are 22 and 23 degree, respectively, if only the average torque is selected as the objective function; (ii) the optimal stator and rotor pole arc angles are also 22 and 23 degree, respectively, if only the average torque per copper loss is selected as the objective function; (iii) the optimal stator and rotor pole arc angles are 19 and 20 degree, respectively, if only the average torque per motor lamination volume is selected as the objective function; and (iv) the optimal stator and rotor pole arc angles are 22 and 23 degree, respectively, if the average torque, the average torque per copper loss and the average torque per motor lamination volume are selected as the objective functions simultaneously and they have the same weight factors, which are equal to ⅓.

TABLE III

RESULTS OF MULTI-OBJECTIVE OPTIMIZATION

| Weight factor | Objective function | Optimal $\beta_s$ | Optimal $\beta_r$ |
|---|---|---|---|
| $w_t = 1, w_{tp} =$ | 1.0 | 22 | 23 |
| $w_{tp} = 1, w_t =$ | 1.0 | 22 | 23 |
| $w_t = w_{tp} = 1,$ | 1.0 | 19 | 20 |
| $w_t = w_{tp} = w_{tv}$ | 0.991149 | 22 | 23 |

The in-wheel SRM of the present invention can be applied to EVs. Thus, high torque, low copper loss and high torque density are desired for the in-wheel SRM design. Consequently, the average torque, the average torque per copper loss and the average torque per motor lamination volume should take up the same share in the optimization objective function. Therefore, the optimal stator and rotor pole arc angles of a four-phase SRM are 22 and 23 degree, respectively.

Table IV shows the values of three criterions at different combinations of stator and rotor pole arc angles. It can be seen that the optimal stator pole arc angle (22 degree) and optimal rotor pole arc angle (23 degree) result in the best design that means high torque, low copper loss and high torque density.

TABLE IV

COMPARISONS BETWEEN VARIOUS DESIGNS

| $\beta_s$ | $\beta_r$ | $T_{ave}/T_b$ | $TP/TP_b$ | $TV/TV_b$ |
|---|---|---|---|---|
| 22 | 23 | 1.0 | 1.0 | 0.973450 |
| 19 | 20 | 0.927223 | 0.941108 | 1.0 |
| 20 | 21 | 0.955214 | 0.958662 | 0.992916 |
| 21 | 22 | 0.979854 | 0.987391 | 0.984439 |
| 22 | 24 | 0.946465 | 0.999889 | 0.917623 |

TABLE V

DESIGNED DIMENSIONS OF IN-WHEEL SRM

| Design parameter | Value |
|---|---|
| Outer diameter | 382 mm |
| Length of air gap | 0.5 mm |
| Stator pole arc | 22 |
| Rotor pole arc | 23 |
| Outer diameter | 266 mm |
| Length of stack | 74 mm |
| Thickness of | 46 mm |
| Thickness of | 32 mm |
| Number of turns | 136 |

Table V shows the data of the optimal design of the in-wheel SRM. Using the data, the prototype of the four-phase in-wheel SRM has been manufactured. FIG. 9 shows the parameters of the optimally designed in-wheel SRM.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A switched reluctance motor comprising:
   an inner stator having a plurality of stator poles with coil windings, the inner stator having a plurality of stator phases;
   an outer rotor configured to rotate around the inner stator, the outer rotor having a plurality of rotor poles;
   at least one position sensor configured to detect a position of the outer rotor; and
   a DC supply configured to sequentially supply current to excite the stator phases,
   wherein the stator having a pole arc angle of stator $\beta_s^{opt}$ and the rotor having a pole arc angle of rotor $\beta_r^{opt}$, which are computed from a multi-objective optimization function that is defined as a compromise between maximum average torque ($T_{ave}$), maximum average torque per copper loss (TP), and maximum average torque per motor core volume (TV).

2. The switched reluctance motor of claim 1, wherein the outer rotor is configured to rotate in a clockwise or a counterclockwise direction.

3. The switched reluctance motor of claim 1, wherein the position signal is used to calculate a rotational speed of the outer rotor.

4. The switched reluctance motor of claim 3, wherein if the rotational speed is below or equal to a rated value, the switched reluctance motor operates in a constant torque mode.

5. The switched reluctance motor of claim 3, wherein if the rotational speed is above a rated value, the switched reluctance motor operates in a constant power mode.

6. The switched reluctance motor of claim 1, wherein the outer rotor is fixed to a wheel.

7. The switched reluctance motor of claim 1, wherein the stator is fixed to a shaft that is partially hollow.

8. The switched reluctance motor of claim 1, wherein the $\beta_s^{opt}$ and the $\beta_r^{opt}$ are determined by the multi-objective optimization function, $$F_{opt}(\beta_s^{opt}, \beta_r^{opt}) = \max\left\{w_t \frac{T_{ave}}{T_b} + w_{tp} \frac{TP}{TP_b} + w_{tv} \frac{TV}{TV_b}\right\},$$

wherein $w_t$=weight factor of average torque,
$w_{tp}$=weight factor of average torque per copper loss,
$w_{tv}$=weight factor of average torque per motor lamination volume,
$T_b$=base value of average torque,
$TP_b$=base value of average torque per copper loss,
$TV_b$=base value of average torque per motor lamination volume.

9. The switched reluctance motor of claim 8, wherein the $\beta_s^{opt}$ and the $\beta_r^{opt}$ are 22 degree and 23 degree, respectively, if the switched reluctance motor is a four-phase switched reluctance motor.

* * * * *